(12) United States Patent
Moehlmann et al.

(10) Patent No.: US 9,097,153 B2
(45) Date of Patent: Aug. 4, 2015

(54) COMBUSTION ENGINE EXHAUST SYSTEM WITH DEVICE FOR HEAT RECOVERY, AND METHOD FOR OPERATING SUCH AN EXHAUST SYSTEM

(75) Inventors: Bert Moehlmann, Mainz (DE); Lothar Seybold, Nauheim (DE); Kai-Ove Pietsch, Weiterstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 13/590,526

(22) Filed: Aug. 21, 2012

(65) Prior Publication Data

US 2013/0047591 A1 Feb. 28, 2013

(30) Foreign Application Priority Data

Aug. 23, 2011 (DE) .......................... 10 2011 111 471

(51) Int. Cl.
*F01N 3/02* (2006.01)
*F01N 5/02* (2006.01)

(52) U.S. Cl.
CPC .............. *F01N 5/02* (2013.01); *F01N 2240/02* (2013.01); *F01N 2240/36* (2013.01); *Y02T 10/16* (2013.01)

(58) Field of Classification Search
CPC ....... F01N 13/02; F01N 13/087; F01N 1/163; F01N 1/008; F01N 3/02; F01N 3/025; F01N 2240/02; F01N 2260/03
USPC ........... 60/274, 287, 288, 292, 298, 299, 320, 60/324
See application file for complete search history.

(56) References Cited

U.S. PATENT DOCUMENTS

| | | | | |
|---|---|---|---|---|
| 4,023,360 A | * | 5/1977 | Wossner et al. | .................. 60/277 |
| 5,159,815 A | | 11/1992 | Schlamadinger | |
| 5,836,152 A | * | 11/1998 | Schatz | ............................ 60/274 |
| 6,141,961 A | | 11/2000 | Rinckel | |
| 6,702,190 B1 | * | 3/2004 | Nohl et al. | ................ 237/12.3 C |
| 6,739,579 B1 | | 5/2004 | Rim | |

(Continued)

FOREIGN PATENT DOCUMENTS

| | | |
|---|---|---|
| DE | 102006039571 A1 | 3/2008 |
| DE | 102008008697 A1 | 8/2009 |

(Continued)

OTHER PUBLICATIONS

German Patent Office, German Search Report for Application No. 102011111471.1, dated Feb. 16, 2012.

(Continued)

*Primary Examiner* — Binh Q Tran
(74) *Attorney, Agent, or Firm* — Ingrassia Fisher & Lorenz PC

(57) ABSTRACT

Exhaust systems of a combustion engine of a motor vehicle, motor vehicles with exhaust systems, and methods for operating an exhaust system of a combustion engine in a motor vehicle are provided. An exhaust system includes an exhaust line comprising a heat exchanger branch and a bypass branch. The exhaust line has an adjustable control element by which combustion gas flowing through the exhaust line is fed to the heat exchanger branch and/or the bypass branch. A heat exchanger is connected to the heat exchanger branch and to a cooling circuit and an adjusting mechanism has an actuator for adjustment of the adjusting mechanism. The adjusting member of the adjusting mechanism is configured such that the actuator is spaced from the exhaust line.

14 Claims, 3 Drawing Sheets

(56) References Cited

U.S. PATENT DOCUMENTS

| | | | |
|---|---|---|---|
| 6,810,850 B2 * | 11/2004 | Anderson et al. | 123/323 |
| 7,527,126 B2 * | 5/2009 | Kuroda et al. | 181/254 |
| 8,443,593 B2 * | 5/2013 | Sloss et al. | 60/320 |
| 8,475,754 B2 * | 7/2013 | Eigenberger et al. | 423/213.2 |
| 8,522,537 B2 * | 9/2013 | Lee et al. | 60/320 |
| 8,646,262 B2 * | 2/2014 | Magnetto | 60/320 |
| 2005/0109024 A1 | 5/2005 | Nohl et al. | |
| 2007/0272480 A1 | 11/2007 | Kuroda et al. | |
| 2008/0104950 A1 | 5/2008 | Palanchon et al. | |
| 2010/0146943 A1 | 6/2010 | Muramatsu et al. | |
| 2012/0151999 A1 | 6/2012 | Seybold et al. | |

FOREIGN PATENT DOCUMENTS

| | | |
|---|---|---|
| DE | 102008023806 A1 | 11/2009 |
| DE | 202010003133 U1 | 6/2010 |
| JP | 2007239595 A | 9/2007 |
| KR | 20110121942 A | 11/2011 |

OTHER PUBLICATIONS

UKIPO, British Search Report for Application No. GB1210964.1, dated Oct. 22, 2012.

* cited by examiner

COMBUSTION ENGINE EXHAUST SYSTEM WITH DEVICE FOR HEAT RECOVERY, AND METHOD FOR OPERATING SUCH AN EXHAUST SYSTEM

CROSS-REFERENCE TO RELATED APPLICATION

This application claims priority to German Patent Application No. 10 2011 111 471.1, filed Aug. 23, 2011, which is incorporated herein by reference in its entirety.

TECHNICAL FIELD

The technical field is in the field of automotive engineering and relates to an exhaust system of a combustion engine of a motor vehicle, the exhaust system having a device for heat recovery, and a method for operating such an exhaust system.

BACKGROUND

Modern motor vehicles are increasingly being equipped with exhaust systems having heat exchangers for the recovery of energy from the hot exhaust gas flow. To this end, the exhaust line typically has a branching-out structure with a heat exchanger branch and a bypass branch, wherein for example the exhaust gas flow can be optionally conducted via the bypass branch and/or the heat exchanger branch via an exhaust gas flap adjustably arranged in the exhaust line. The heat exchanger is connected to a cooling circuit for circulating coolant, which for example is the cooling circuit of the combustion engine.

In the case of such an exhaust system, the hot exhaust gas following a cold start is usually conducted entirely via the heat exchanger in order to recover valuable energy from the exhaust gas and to accelerate the heating-up phase of the combustion engine. In contrast with this, the hot exhaust gas is conducted at least in part through the bypass branch in the case of a warm combustion engine in order to protect the coolant from excessive heating. In addition to this, the emission characteristic of the combustion engine can be influenced through this measure in an advantageous manner.

The fundamental construction of such an exhaust system is well known to the person skilled in the art and has already been thoroughly described in the patent literatures. Merely as an example, reference is made in this connection to the German disclosure Publication DE 102008023806 A1.

The exhaust flap can be brought into different operating positions in order to conduct the hot exhaust gas to the bypass branch or the heat exchange branch in the desired manner. Up to now, the exhaust flap is actuated by means of a mechanical actuator, for example a so-called "wax motor". This is a linear actuator, wherein a push rod coupled to the exhaust flap interacts with a wax capsule. When the wax capsule for example is heated through the surrounding coolant, the wax expands with the result that the push rod is moved further out of the actuator housing and the exhaust flap is moved in the wand direction. When the wax capsule cools down again, the push rod is again retracted in the actuator housing for example by means of a spring, so that the exhaust flap is moved in the other direction. As a rule, the wax motor is thermally coupled to the coolant of the exhaust gas heat exchanger, so that the exhaust flap is thermostatically controlled. As an alternative it would also be possible for example to provide a vacuum box instead of a wax motor, which is activated for example by the engine control unit as a function of the coolant temperature of the engine.

Thus, a thermostatic control of the exhaust flap takes place in conventional exhaust systems, where there is no utilizable information available with respect to the position of the exhaust flap. The use of an electric actuator and/or an electric sensor is out of the question because of the heat development that is present in the exhaust line.

SUMMARY

Various embodiments of an exhaust system for a combustion engine of a motor vehicle are provided. The exhaust system includes an exhaust line, which comprises a bypass branch and a heat exchanger branch that is parallel with the bypass branch, which combine into a common section downstream. In the heat exchanger branch, a device for the heat recovery, in the following called a "heat exchanger," connected to a cooling circuit for the circulation of coolant is arranged, which can be subjected to an about or through-flow circulation, wherein energy can be transferred from the exhaust gas to the coolant in the heat exchanger.

In addition, the exhaust line comprises a controllable or adjustable control element, for example an exhaust flap, which is arranged and configured so that the combustion gas flowing through the exhaust line can be optionally fed to the heat exchanger branch and/or the bypass branch. The control element is coupled by an adjusting mechanism with an actuator for its adjustment. In an embodiment, the actuator comprises a sensor (e.g. integrated), in particular an electric sensor, for example an electric position sensor for determining the current position of the control element. For example, this can be an angled off rotation sensor for determining the angle of rotation of an exhaust flap. All types of actuators (thermophysical, pneumatic, hydraulic actuators etc.), which were expanded by a sensor for determining the position of the control element, can be used herein. The actuator for example is an electric actuator, in particular an electric motor.

In an embodiment, the adjusting mechanism is a mechanical adjusting mechanism, wherein the term "mechanical" also includes fluid-supported adjusting mechanisms, i.e. hydraulic and/or pneumatic adjusting mechanisms.

According to an embodiment, an adjusting member of the (e.g. mechanical) adjusting mechanism is configured for arranging the actuator spaced from the exhaust line, i.e., for arranging it with an intermediate spacing from the exhaust line that is adjustable by choice. Here, the adjusting member is configured so that the intermediate spacing between actuator and exhaust line is so great that heating of the actuator through heat given off by the drive line up to beyond a critical temperature, at which impairment or damaging in particular of electrical components of the actuator and sensor has to be feared, for example approximately 130° C., can be avoided.

In the exhaust system, the actuator can thus be arranged at a predefinable distance from the exhaust line so that in an advantageous manner a thermally-induced impairment or damaging of the actuator and included electrical components, in particular of an integrated sensor through heat given off by the exhaust line can be avoided. For this purpose, the actuator is arranged from the exhaust line for example at a distance that is in the two-digit centimeter range, but wherein it is also conceivable that the actuator is arranged more closely to the exhaust line.

In the exhaust system the (e.g. mechanical) adjusting mechanism can be embodied in any form in principle, wherein in the above configuration an elongated adjusting member is present through which the actuator can be spaced from the exhaust line. For this purpose, the control element configured in the form of an exhaust flap can for example be pivotably mounted on a shaft and the actuator coupled to the exhaust flap by way of a coupling rod eccentrically connected to the shaft, as a result of which a coupling that is simple and cost-effective in the industrial series production of motor vehicles can be realized between actuator and exhaust flap.

According to a further embodiment, the actuator is connected to the cooling circuit of the heat exchanger and can be cooled through coolant circulating in the cooling circuit. In the exhaust system, the actuator can thus be cooled through coolant of the heat exchanger, so that in an advantageous manner a thermally-induced impairment of damaging of the actuator and integrated electrical components, in particular an electric sensor, through heat given off by the exhaust line can be avoided. In a particularly advantageous manner, no separate device has to be provided for the coolant cooling of the actuator. The actuator is rather connected to the cooling circuit of the heat exchanger in a cost-effective manner. For this purpose, the actuator comprises a jacket surrounding an actuator core, which forms a hollow space through which coolant for the cooling of the actuator core can flow.

In the exhaust system, the use of an electric actuator for the exhaust flap, for example with at least one integrated sensor, is thus made possible for the first time, which because of the risk of thermally-induced damaging was out of the question up to now. The electric actuator can be activated by the on-board electronic system, i.e. a control unit that is suitably equipped in terms of program, so that a wide variety of control options can be realized without having to provide a merely thermostatic control in the process. The controllable control element for controlling the exhaust flow can be activated for example as a function of different operating states of the combustion engine in order to achieve a preferably good or optimum effect with respect to the working of the combustion engine. In addition, the current position of the control element, e.g. angle of rotation of an exhaust flap can be captured for example via an electric position sensor integrated in the actuator and made available to the control unit, so that the control of the control element, in particular adjustment of the exhaust flap, can be adapted to the actual conditions.

In another embodiment, the electric actuator is at least partially surrounded by a heat shield that is suitably designed for shielding of heat radiation, wherein the heat shield is located between the actuator and the exhaust line. This can for example be one or a plurality of heat protection plates which protect the actuator from the heat (substantially heat radiation) given off by the exhaust line. Thus, the actuator can be protected even better against thermal damaging, wherein the actuator in particular, can be arranged closer to the exhaust line than without a heat shield, for example in order to fulfill certain installation space requirements.

In addition, a motor vehicle which is equipped with an exhaust system as described above is provided.

Furthermore, a method for operating an exhaust system as described above is provided. During the method, the actuator is cooled through coolant of the cooling circuit of the heat exchanger.

It is to be understood that the various embodiments herein can be realized individually or in any combinations in order to achieve further improvements of the thermal protection of the actuator from heat given off by the exhaust line. In particular, the features mentioned above and still to be explained in the following cannot only be used in the combination stated but also in other combinations or by themselves.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
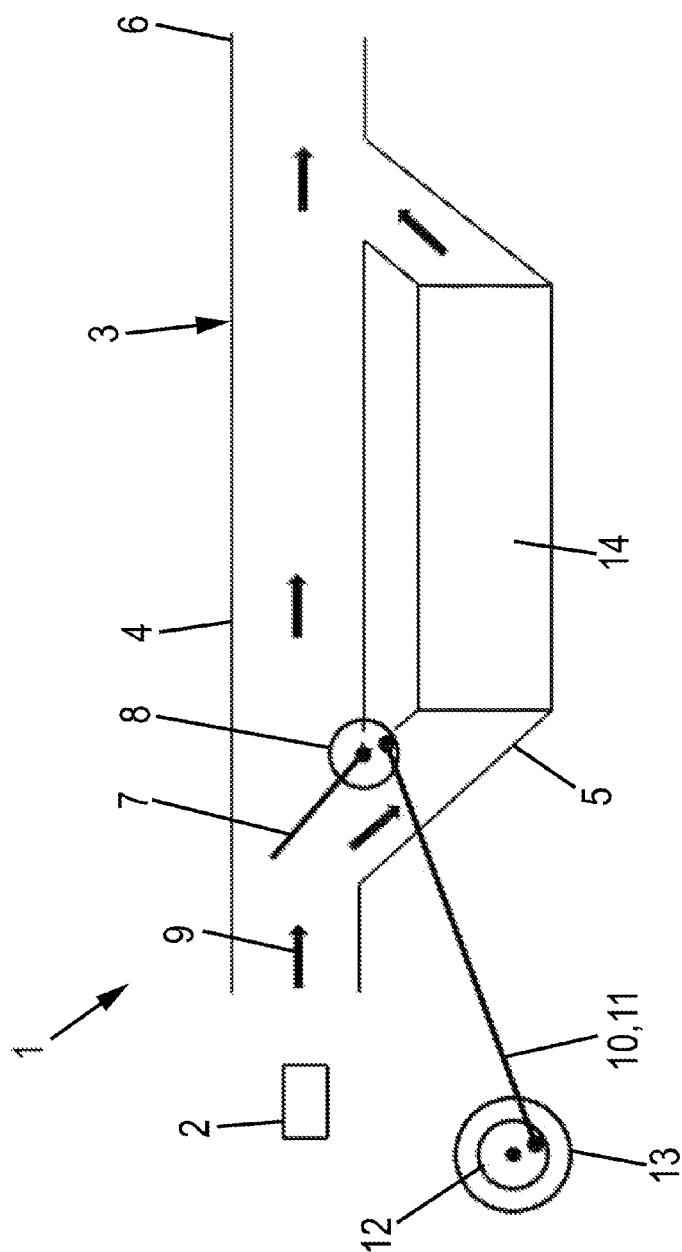
FIG. 1 is a schematic representation of an exhaust system according an exemplary embodiment.

FIG. 1 illustrates an exhaust system 1, according to an exemplary embodiment. The exhaust system 1 comprises an exhaust line 3 fed by a combustion engine 2. The exhaust line forks out into a bypass branch 4 and into a heat exchanger branch 5, which subsequently reunite in a region 6 located downstream of the two branches 4, 5. In the region of the branching, an adjustably arranged exhaust flap 7 is provided, which in the present exemplary embodiment is pivotably mounted about a pivot shaft 8 and can be adjusted between two end positions.

In contrast with the bypass branch 4, a heat exchanger 14 is arranged in the heat exchanger branch 5, which is fluidically connected to a cooling circuit that is not shown in FIG. 1. A coolant, for example a water/glycol mixture circulates in the cooling circuit. The cooling circuit can for example be the cooling circuit of the combustion engine 2, wherein however a separate cooling circuit can be equally provided. In the heat exchanger branch 5 the heat exchanger 14 is arranged so that it can be subjected to an about or throughflow of the hot exhaust gas flow 9, so that heat from the hot exhaust gas flow 9 can be given off to the coolant in the heat exchanger 14. The heated coolant is subsequently fed to a thermal utilization, for example in that electric energy is generated, which need not be discussed in more detail herein.

Depending on the position of the exhaust flap 7, the exhaust flow 9 generated by the combustion engine 2 can flow completely via the bypass branch 4 (first end position), completely via the heat exchanger branch 5 (second end position), or, as shown in FIG. 1, proportionally via the bypass branch 4 and the heat exchanger branch 5 (intermediate position). When the exhaust flap 7 is in the intermediate position, the exhaust gas flow 9 can be divided over the bypass branch 4 and the heat exchanger branch 5 to even or uneven parts.

The exhaust flap 7 can be adjusted by a purely mechanical adjusting mechanism, altogether designated with the reference number 10. This adjusting mechanism comprises as adjusting member a coupling rod 11, which couples the pivot shaft 8 to an electric actuator 12, which in this case is for example embodied as electric motor. For this purpose, the coupling rod 11 is eccentrically connected in each case both with the pivot shaft 8 of the exhaust flap 7 as well as with a driven rotary shaft 13 of the actuator 12, for example through ball joints, so that the exhaust flap 7 through rotating the rotary shaft 13 can be pivoted about the pivot shaft 8 and adjusted in the two end positions as well as intermediate positions between the two end positions.

The exhaust line 3, in particular the bypass branch 4 and the heat exchanger branch 5 are surrounded by a common housing (not shown), wherein the pivot shaft 8 is run as far as to the outside of the housing and thus coupled to the coupling rod 11 outside the housing.

In the actuator 12, an electric angle of rotation sensor (not shown) is integrated, through which a current angle of rotation of the exhaust flap 7 can be sensed.

For adjusting the exhaust flap 7, the actuator 12 can be activated by an electric control device (not shown) of the motor vehicle, for example an engine control unit typically employed in modern motor vehicles. A control of the exhaust flap 7 is advantageously based on the current angle of rotation of the exhaust flap 7 since by the integrated angle of rotation sensor.

The coupling rod 11 makes possible that the actuator 12 can be arranged at a certain intermediate spacing from the exhaust line 3, so that it is exposed to a reduced heat loading through the exhaust line 3. In fact, the use of an electric actuator 12 with an integrated electric angle of rotation sensor is made possible through this in the first place. An electric actuator 12 arranged for example on the housing of the exhaust line 3 would be irreversibly damaged within a very short time without special precautions and exhaust gas temperatures of typically approximately 900° C. Usually, electrical devices, for example electric motors can only withstand maximum temperatures of up to 130° C.

In the exhaust system 1 illustrated in FIG. 1 the distance between the electric actuator 12 and the exhaust line 3 is selected so that the actuator 12 is not heated so severely that it reaches a critical temperature, for example 130° C., at which thermally-induced damaging must be expected. Thus, thermally-induced damaging of the actuator 12 can be reliably and securely avoided. For this purpose, the actuator 12 has a distance from the exhaust line 3 with which for example is within the two-digit centimeter range.

Figure 2:
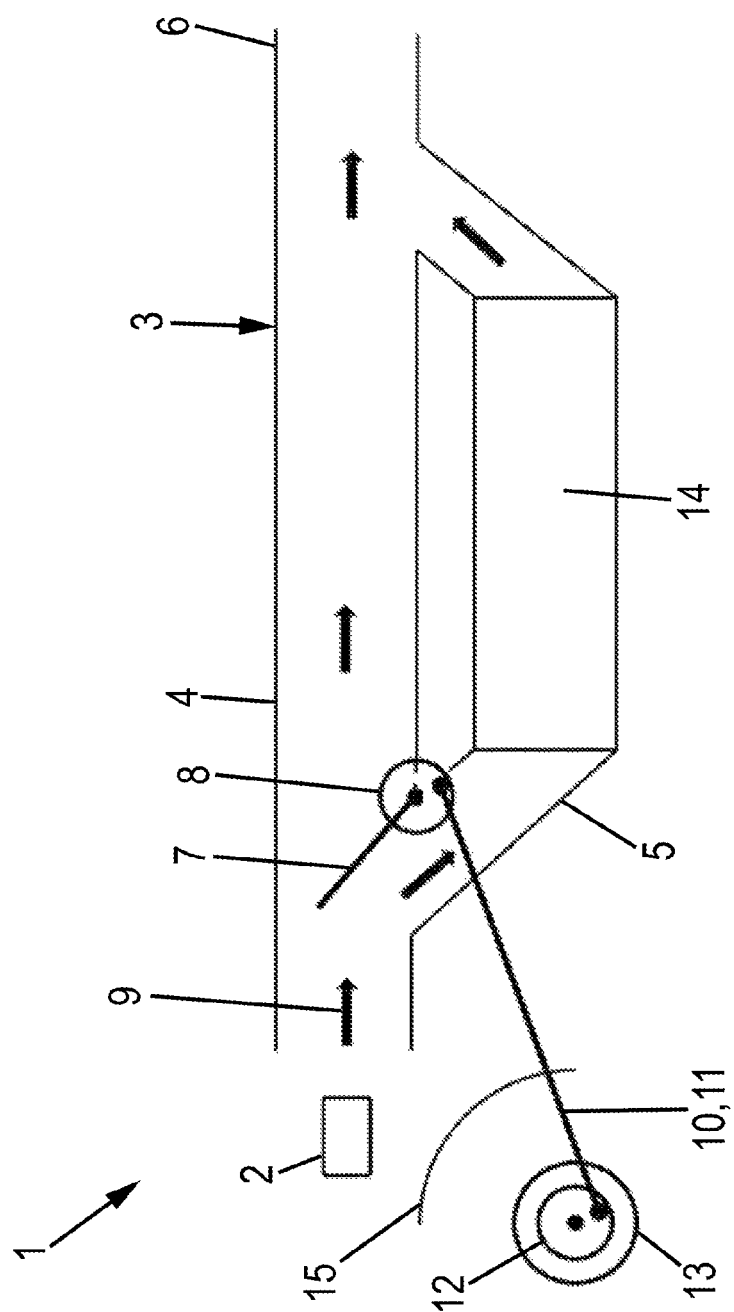
FIG. 2 is a schematic representation of an exhaust system according another exemplary embodiment.

FIG. 2 shows a second exemplary embodiment of the exhaust system 1, which is a variant of the exhaust system 1 from FIG. 1. In order to avoid unnecessary repetitions, merely the differences to the exemplary embodiment of FIG. 1 are explained and reference is otherwise made to the explanations made with respect to FIG. 1.

Accordingly, a heat shield 15 is provided, which is arranged between the electric actuator 12 and the exhaust line 3. The heat shield 15 for example consists of one or a plurality of plates, through which the heat radiation of the exhaust line 3 is shielded, so that the actuator 12 is even better protected from the heat loading through the exhaust line 3. This makes possible that the actuator 12 can be arranged closer to the exhaust line 3, for example in order to satisfy certain installation space requirements.

Figure 3:
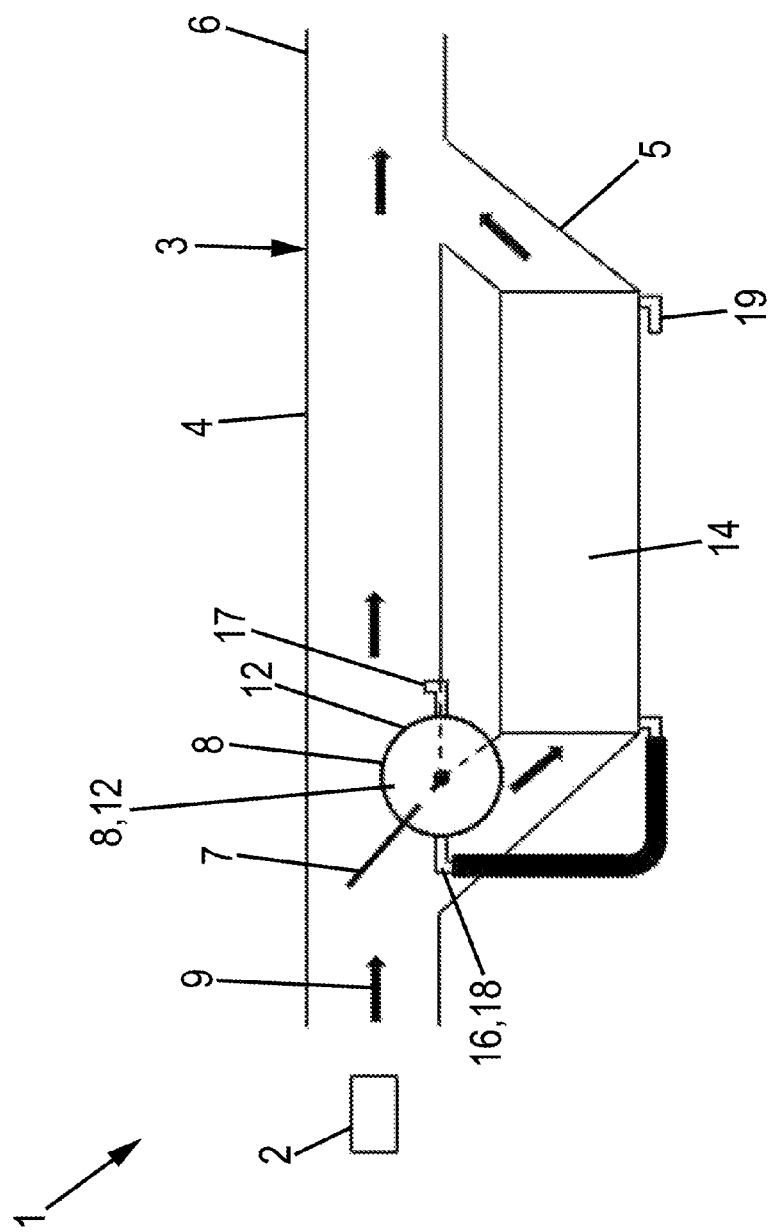
FIG. 3 is a schematic representation of an exhaust system according a further exemplary embodiment.

FIG. 3 shows another exemplary embodiment of the exhaust system 1, which is a further variant of the exhaust system 1 from FIG. 1. In order to avoid unnecessary repetitions, merely the differences to the exemplary embodiment of FIG. 1 are explained and reference is otherwise made to the explanations made with respect to FIG. 1.

Accordingly, the actuator 12 is attached for example to the outside of the housing of the exhaust line 3. The actuator 12 is at least spaced from the exhaust line 3 so that without special precautions for protection against the heat given off by the exhaust line 3 there is a risk of damaging electrical components of the actuator 12 or of an integrated angle of rotation sensor. The rotary shaft 13 of the actuator 12 for example is directly coupled to the pivot shaft 8.

In order to avoid excessive heating of the actuator 12, the actuator 12 is connected to the cooling circuit 16 of the heat exchanger 14, wherein the actuator 12 is fluidically connected in series to the heat exchanger 14. For this purpose, the actuator 12 comprises an inflow 17 for conducting coolant into a hollow space which is not shown in more detail between an actuator core and an outer jacket, wherein the actuator 12 can give off heat to the coolant that is located in the hollow space. Downstream of the actuator 12, coolant heated by the actuator 12 is conducted into a connecting line 19 which fluidically connects the actuator 12 and the heat exchanger 14. From there, the coolant reaches the heat exchanger 14, in order to cool hot exhaust gas in the heat exchanger branch 5. The heat exchanger 14, in turn, has a drain in order to discharge the coolant that is heated even further. Thus, heating of the actuator 12 to beyond a critical temperature, for example 130° C., at which damaging of the electrical components has to be feared, can be reliably and securely avoided through the transfer of heat to the coolant. A fluidic connection of the actuator 12 to the cooling circuit 16 of the heat exchanger 14 can be cost-effectively and easily realized in the series production of motor vehicles.

Although not shown in the Figures, it could be likewise also possible to realize the coolant cooling of the actuator 12 illustrated by means of FIG. 3 in an exhaust system 1, such as is illustrated in FIG. 1 or FIG. 2, in order to achieve a combined effect of the measures for protecting the actuator 12 and integrated sensor from thermal damage through heat given off by the exhaust line 3.

The exhaust system for a combustion engine of a motor vehicle contemplated herein thus creates the possibility for the first time of using an electric actuator with integrated sensor for controlling the exhaust flap. Excessive heating of the actuator and sensor through heat given off by the exhaust line can be reliably, securely and cost-effectively avoided through spacing the actuator from the exhaust line, an additional heat shield between actuator and exhaust line and/or a coolant cooling of actuator and sensor through coolant of the cooling circuit of the heat exchanger.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An exhaust system of a combustion engine of a motor vehicle, the exhaust system comprising:
    an exhaust line forking out from a branching point into a heat exchanger branch and a bypass branch and reuniting at a region downstream of the heat exchanger branch and the bypass branch, wherein the exhaust line has an adjustable control element including an exhaust flap located at the branching point and partially positionable into the bypass branch for proportionally diverting combustion gas flowing through the exhaust line from the exhaust line to the heat exchanger branch and the bypass branch;
    a heat exchanger connected to the heat exchanger branch and to a cooling circuit;
    an adjusting mechanism configured to move the adjustable control element, the adjusting mechanism comprising:
        an actuator spaced apart from the exhaust line wherein the actuator is connected to the cooling circuit of the heat exchanger and is cooled by a coolant circulating in the cooling circuit, and an adjusting member connected to the actuator and to the adjustable control element, the adjusting member is configured to adjust the angular position of the adjustable control element; and a heat shield interposed between exhaust line and the actuator.

2. The exhaust system according to claim 1, wherein the adjustable control element is the exhaust flap pivotably mounted on a shaft and the actuator is coupled to the exhaust flap via a coupling rod eccentrically connected to the shaft.

3. The exhaust system according to claim 1, wherein the actuator is at least spaced from the exhaust line a distance that is in a two-digit centimeter range.

4. The exhaust system according to claim 1, wherein the actuator is at least partially surrounded by the heat shield for shielding heat radiation.

5. The exhaust system according to claim 1, wherein the actuator comprises a jacket, wherein between the jacket and an actuator core a hollow space through which the coolant for cooling the actuator core can flow, is formed.

6. An exhaust system of a combustion engine of a motor vehicle, the exhaust system comprising:
   an exhaust line forking out from a branching point into a heat exchanger branch with a heat exchanger and a bypass branch connected to a cooling circuit and reuniting at a region downstream of the heat exchanger branch and the bypass branch;
   an adjustable control element including an exhaust flap located at the branching point and partially positionable into the bypass branch for diverting combustion gas flowing through the exhaust line to the heat exchanger branch and the bypass branch;
   an actuator coupled to the adjustable control element for adjustment of the adjustable control element by an adjusting mechanism, the actuator coupled into the cooling circuit of the heat exchanger and is cooled by a coolant circulating through the cooling circuit.

7. The exhaust system according to claim 6, wherein the actuator comprises a jacket, wherein between the jacket and an actuator core a hollow space through which the coolant for cooling the actuator core can flow is formed.

8. The exhaust system according to claim 6, wherein an adjusting member of the adjusting mechanism is configured to arrange the actuator spaced from the exhaust line.

9. The exhaust system according to claim 8, wherein the adjustable control element is an exhaust flap pivotably mounted on a shaft and the actuator is eccentrically coupled to the exhaust flap via a coupling rod eccentrically connected to the shaft.

10. The exhaust system according to claim 6, wherein the actuator has at least a distance from the exhaust line that is in a two-digit centimeter range.

11. The exhaust system according to claim 6, wherein the actuator is at least partially surrounded by a heat shield that is arranged between the actuator and the exhaust line.

12. The exhaust system according to claim 6, wherein the actuator comprises a sensor for sensing a position of the adjustable control element.

13. The exhaust system according to claim 12, wherein the actuator comprises the sensor for sensing an angle of rotation of the adjustable control element.

14. A motor vehicle having an exhaust system comprising:
   an exhaust line forking out from a branching point into a heat exchanger branch and a bypass branch and reuniting at a region downstream of the heat exchanger branch and the bypass branch, wherein the exhaust line has an adjustable control element including an exhaust flap located at the branching point and partially positionable into the bypass branch for diverting combustion gas flowing through the exhaust line from the exhaust line to the heat exchanger branch and the bypass branch;
   a heat exchanger connected to the heat exchanger branch and to a cooling circuit; and
   an adjusting mechanism with an actuator for adjustment of the adjusting mechanism wherein the actuator is connected to the cooling circuit of the heat exchanger and is cooled by a coolant circulating in the cooling circuit; and
   a heat shield interposed between the exhaust line and the actuator.

* * * * *